April 2, 1968 F. B. GOWER III 3,376,405
INCUBATING APPARATUS
Filed Nov. 27, 1964 2 Sheets-Sheet 1
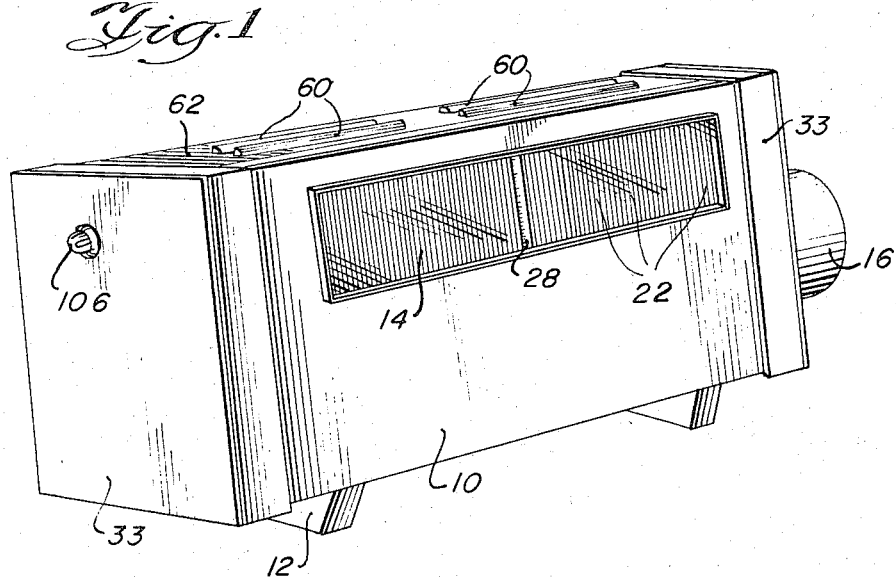
Fig. 1
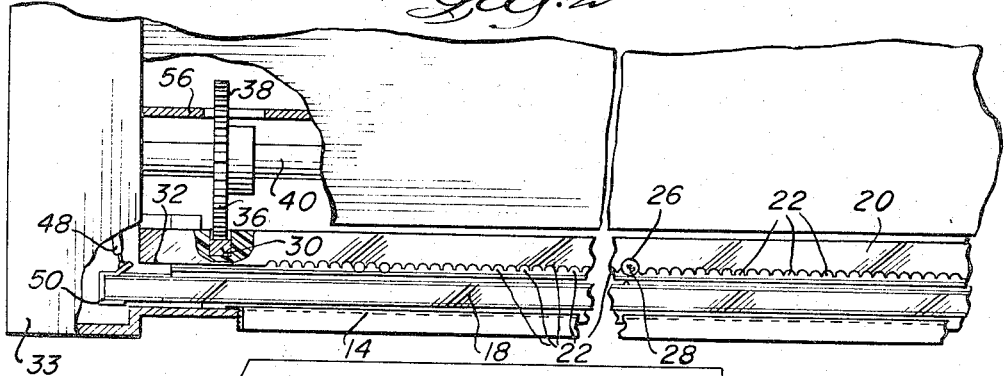
Fig. 2
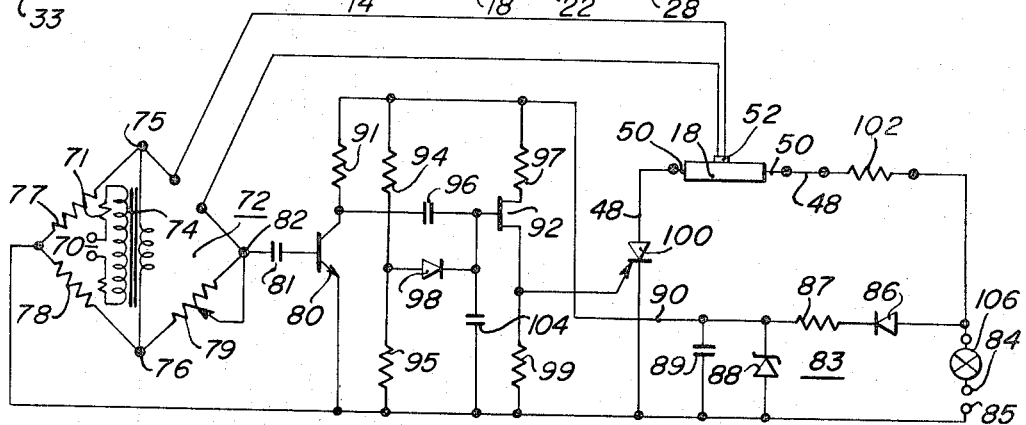
Fig. II
INVENTOR.
Francis Bert Gower III
By Dressler, Goldsmith, Clement, Gordon & Ladd
ATTORNEYS.

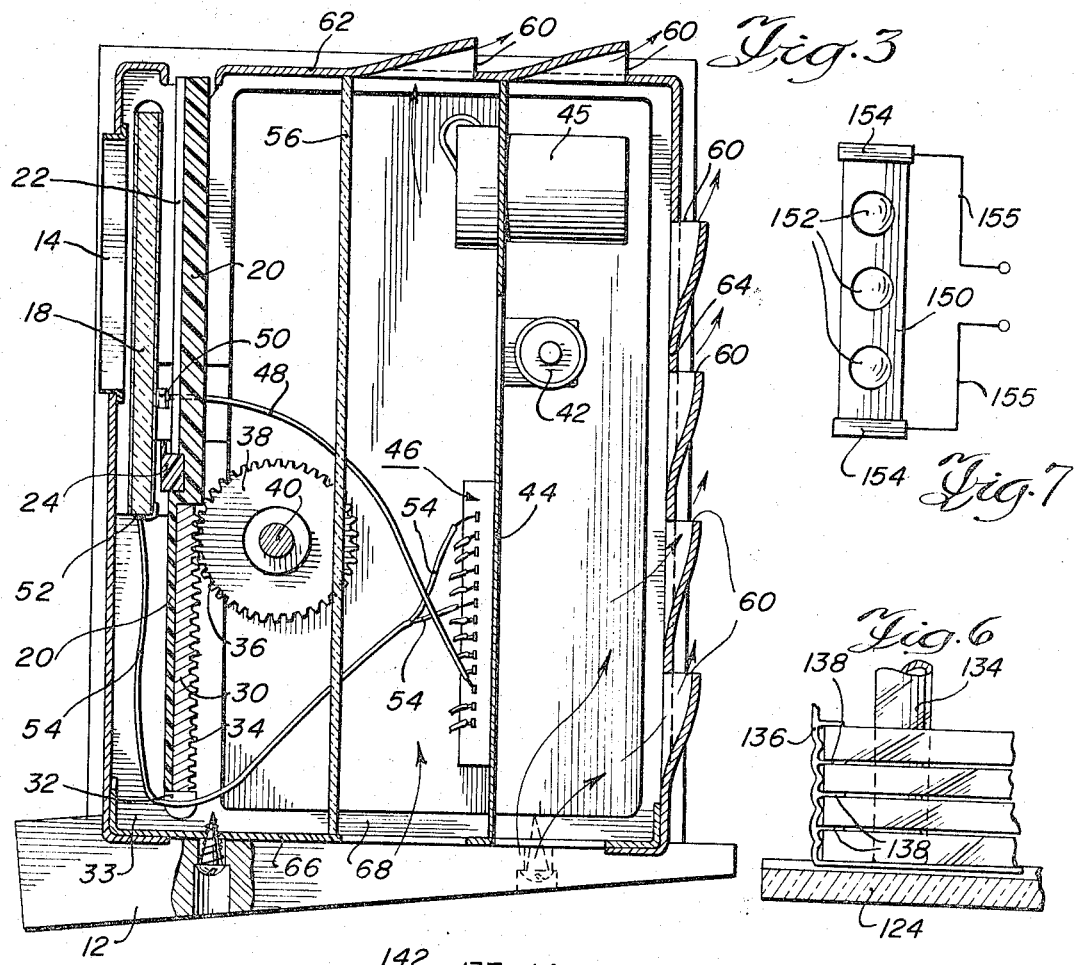
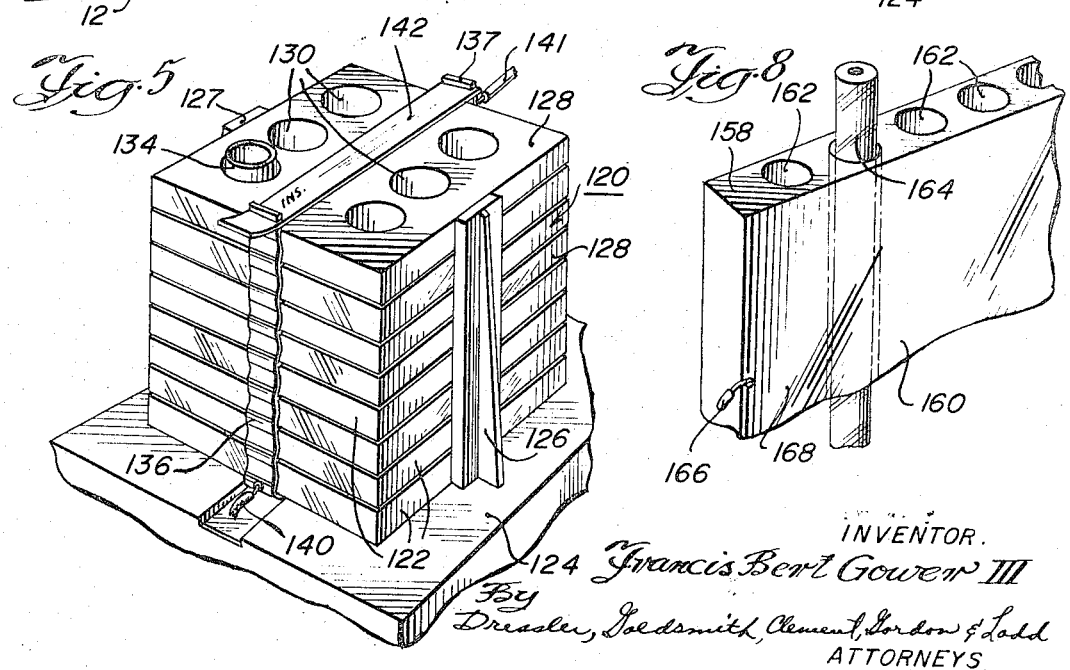

United States Patent Office 3,376,405
Patented Apr. 2, 1968

3,376,405
INCUBATING APPARATUS
Francis B. Gower III, Chicago, Ill., assignor to Michael Reese Research Foundation, a nonprofit corporation of Illinois
Filed Nov. 27, 1964, Ser. No. 414,187
6 Claims. (Cl. 219—385)

ABSTRACT OF THE DISCLOSURE

Incubating apparatus including a solid, electrically conductive light transmitting means for (1) viewing the object being incubated, and (2) supplying the heat to the object.

---

This invention relates to an incubating system, more particularly to a system for incubating objects where simultaneous viewing of the objects is desirable. As used herein, the term "incubating" includes any *heating* of an object as well as the *maintenance* of a desired temperature.

There are several types of apparatus for incubating on the market today. One widely used type comprises a chassis carrying a rheostat-controlled incandescent bulb. The bulb serves to illuminate the object being incubated and also serves as the source of heat. Although the use of this type of incubator has been well established, there is a need for an incubator having the ability to maintain the object at a more constant temperature.

Another type of incubating apparatus in wide use today is the water bath type. The objects to be incubated are immersed within the water-filled instrument, and the temperature of the water is maintained by means of a heater also immersed therein. To maintain a constant temperature throughout the bath, several stirrers rapidly circulate the water. One of the major drawbacks of this type of incubating system is the need for a water tank which results in a relatively large structure. Further, the use of water to provide a constant temperature, stirrers to circulate the water, and an electric motor to rotate the stirrers, provides a relatively heavy and expensive apparatus.

A further type of unit in use today is the sand blast type in which sand is blown around a tube containing the specimen to be incubated. This type of unit is unduly large, heavy and generally requires much maintenance.

Incubators using heating coils that are positioned within the incubator chassis are also widely in use today. The difficulty in accurately maintaining the temperature of a plurality of objects being incubated has been one of the major drawbacks of this type of device.

In some of the above-mentioned prior art incubators, a transparent window is provided on at least one side of the chassis. The window serves no function other than to enable viewing of the object. These prior art incubators require the window in addition to a heating source if both heating and simultaneous viewing of the object are desired. This requirement adds to the cost of the prior art devices.

The present invention avoids the above-mentioned difficulties by providing an apparatus that is liquid-free, sand-free, and yet maintains the temperature of the object being incubated at a very constant level. Further, the object can be viewed directly through the heat source itself.

The illustrative embodiments of the invention described in this application generally relate to apparatus for incubating blood specimens. These require simultaneous viewing. However, it is to be understood that the invention is not limited to the incubation of blood specimens, and an apparatus utilizing the principles of the invention may be used for all types of objects requiring incubation.

In accordance with the present invention, there is provided a solid, electrically conductive light transmitting means for viewing the object being incubated. The light transmitting means is suitably supported and means are provided for receiving the object to be incubated and for positioning it proximal to the light transmitting means in heating relationship therewith. When the light transmitting means is connected to an electrical current supply, heat will be dissipated therefrom. The object positioned proximal to the light transmitting means will thereby be placed at approximately the same temperature as the light transmitting means.

In accordance with the present inention, there is prolating means are provided to regulate the flow of current to the light transmitting means. In this manner the heat dissipated by the light transmitting means is regulated to a fine degree. In another embodiment the temperature regulating means includes a temperature sensing device connected directly to the light transmitting means. This expedient enhances the accuracy of the temperature control.

A further explanation of several of the illustrative embodiments of the invention is provided in the following description, and the embodiments are illustrated in the accompanying drawings, in which:

FIGURE 1 is a persective view of an incubating apparatus utilizing the principles of the present invention;

FIGURE 2 is a fragmentary enlarged plan view taken partially in section, of a portion of the incubator shown in FIGURE 1;

FIGURE 3 is a side elevation, taken in section, of the incubating apparatus of FIGURE 1, taken from the right side thereof;

FIGURE 4 is a circuit diagram of a temperature regulating circuit which can be utilized for regulating the incubator temperature;

FIGURE 5 is a perspective view of another embodiment of the present invention;

FIGURE 6 is a fragmentary elevational view thereof;

FIGURE 7 is a plan view of a further embodiment of the present invention; and

FIGURE 8 is a perspective view of another embodiment of the invention.

An apparatus for incubating capillary pipettes is shown in FIGURES 1–3. This apparatus includes a chassis 10 to which is connected a supporting base 12. The front side of the chassis defines an opening 14 for viewing the capillary pipettes during the incubation thereof. A knob 16 is positioned on one side of the chassis to raise the member within the chassis that holds the capillary pipettes.

As shown most clearly in FIGURES 2 and 3, directly behind the opening 14 there is located a solid, electrically conductive light transmitting member 18 which serves as the heat supply and also allows simultaneous viewing of the pipettes.

A specific type of material that has been used successfully as an electrically conductive light transmitting member is E–C Glass, manufactured by the Corning Glass Works. This material comprises a glass having an electrically conductive iridized metal oxide film integrally united with its surface.

The pipettes are carried by a translucent plastic member 20 which has a large number of grooves 22 for receiving the pipettes. The pipettes rest on a support member 24 (FIGURE 3) which is connected to plastic member 20. An oversized groove 26 is provided to receive a thermometer 28, which, as can be observed, is in a position similar to the position of the pipettes, and thus reflects their temperature. Plastic member 20 is enclosed within recesses 32 which are formed within sides 23 of chassis 10.

Two grooves are formed in the rear portion of member 20 to receive a pair of brass guide members 30. The guide members 30 contain a series of teeth 34 which are engaged by teeth 36 of rotatable disc members 38. Disc members 38 are keyed to a shaft 40 which is connected to knob 16, and, clockwise movement of knob 16 will vertically raise member 22 so that the capillary pipettes can be inserted thereinto or removed therefrom.

Positioned rearwardly of member 22 is a fluorescent lamp 42 which is utilized to provide rear illumination to the incubated pipettes. The fluorescent lamp is connected to a support 44 to which is also connected its ballast transformer, its starter 45, and the temperature regulation circuit components 46. The circuit is connected to both sides of the light transmitting member 18 via lines 48 which are soldered to contacts 50. The contacts 50 clamp the edges of the light transmitting member 18, as shown most clearly in FIGURE 2.

An extremely constant temperature control is achieved by connecting the temperature sensing element 52 directly to the light transmitting member 18. In this manner, at the instant a change of temperature occurs at the point of contact of the temperature sensing element 52, the circuit will immediately respond to vary the current flow. This is in contrast to a situation where a temperature sensing element is placed in the position of the capillary pipettes. In the latter instance there would be a time lag before the circuit would be able to respond because the temperature change at the position of the pipettes is not instantaneously responsive to the temperature change of member 18. Temperature sensing element 52 is connected across leads 54 and is affixed to member 18 by means of an epoxy resin.

Means are provided to protect the specimens from heat supplied by sources other than electrically conductive member 18. A transparent plastic member 56 is positioned intermediate fluorescent lamp 42 and member 22 to help insulate the pipettes from the heat of the fluorescent lamp, and from the heat of the regulation circuit components. Several ventilating openings 60 are provided on the top 62 and the rear 64 of the chassis 10 to direct the heat emitted by the circuit components and by the fluorescent lamp away from the incubated specimen. The underside 66 also has openings 68 to aid in the ventilation. The combined use of isolating plastic member 56 and the above-described ventilating provisions has been found to provide effective protection for the incubated specimens from the heat emitted by the fluorescent lamp and by the circuit components.

The device illustrated in FIGURES 1-3 provides an excellent system wherein incubation and simultaneous viewing of the capillary pipettes are desired. There are several tests which require that the blood specimen be kept at a constant temperature (specifically, 37° C.) and that it be viewed during the incubation. For example, in the C-Reactive Protein test, and the P.G.D. test for tuberculosis, the blood specimen is observed during incubation to determine if there is visible precipitate. As another example, the results of the G-6-PD test are determined by observation of the specimen color, since the lack of specimen color change denotes a genetic deficiency.

It is desirable that the blood specimen be maintained at the temperature of 37° C. with a maximum one-half degree variation. Some tests require that the incubated sample be maintained at a temperature with even a smaller temperature variation than one-half degree. A regulating circuit is provided in one embodiment of the present invention, which enables the incubated specimen to be precision temperature regulated at a very constant rate, enabling the device to be used where precise temperature regulation is required. It is to be understood however, that other temperature regulation circuits can be used to regulate an apparatus incorporating the principles of the present invention, and the circuit shown in FIGURE 4 is intended to be an illustrative embodiment of a relatively inexpensive yet highly effective temperature regulating circuit.

The circuit illustrated in FIGURE 4 utilizes a silicon controlled rectifier (SCR) to provide a proportional current control system in contrast to an on-off current control. As used herein, the term "proportional current control" denotes control by varying the magnitude of the current without completely opening the circuit to extinguish current flow.

As stated previously, the output leads 48 are connected to contacts 50 which are affixed to the electrically conductive light transmitting member 18. The sensing circuit input 70 is adapted for connection to a suitable alternating current supply. Temperature sensing element 52 comprises a thermistor connected across one arm of a standard AC bridge circuit 72. The sensing circuit input includes transformer 74 which is connected across the input terminals 75 and 76 of the bridge 72. In series with the primary of transformer 74 is dropping resistor 71 which is utilized to hold the current through thermistor 52 at a value below its self-heating value.

The other arms of bridge 72 include resistors 77, 78 and a potentiometer 79. The signal developed across the bridge is amplified by a single stage which includes an npn transistor 80 having capacitor 81 connected between the transistor base and output terminal 82 of the bridge. A DC signal is applied across the emitter-collector circuit of transistor 80 by means of DC power supply circuit 83. A suitable alternating current supply is connected across terminals 84 and 85 and is rectified by diode 86. Current limiting resistor 87 is provided in series with the diode 86 and a zener diode 88 is connected across the input to provide maximum voltage regulation for the power supply circuit. Filter capacitor 89 is connected in parallel with zener diode 88, and extendng from the positive line 90 is a resistor 91 connected to the collector of transistor 80.

The amplified signal is applied to the emitter of unijunction transistor 92 which is biased almost to the conducting state by a clamping circuit including resistors 94, 95, capacitor 96 and diode 98. Connected to the bases of unijunction transistor 92 are resistors 97 and 99. The overall sensitivity of the circuit is greatly improved by this clamping circuit, since all of the signal, and not only half of the signal, swings to positive.

The voltage dividing network including resistors 94 and 95 additionally serves to protect the zener diode 98. In the event that either the transistor amplifier or the unijunction transistor fails, there will still be enough current through resistors 94 and 95 to keep the voltage drop across resistor 87 high enough to prevent excessive current flow through the zener diode 88.

An SCR 100 is provided in series with the load 18, and also in series with resistor 102. Resistor 102 limits the current through the load 18 in the event of circuit failure, for example, if SCR 100 becomes shorted. A timing capacitor 104 connected to the emitter of unijunction transistor 92 determines the point at which the SCR 100 will fire, by controlling the conductivity of unijunction transistor 92.

If the temperature of the electrically conductive light transmitting member 18 decreases, the resistance of transistor 52 will decrease and a higher signal voltage will be applied to the transistor amplifying circuit. The larger the signal voltage the faster the capacitor 104 will charge, and the triggering of the SCR 100 into conductivity will occur earlier in the cycle of positve voltage supplied to the anode of the SCR, thereby increasing the amount of current to the load 18.

Indicating lamp 106 is provided to indicate when the circuit is in operation.

A specific example of the circuit components used in an actual embodiment is provided in the following table. It is to be understood however, that the invention is not limited to the component examples herein, and other equivalent components and circuits may be substituted without departing from the novel scope of the invention.

| Circuit component: | Typical example |
|---|---|
| Thermistor 52 | ohms 1000 |
| Resistor 71 | do 39,000 |
| Transformer 74 | volt filament 6.3 |
| Resistor 77 | ohms 470 |
| Resistor 78 | do 470 |
| Potentiometer 79 | ohms max 1500 |
| Transistor 80 | 2N1308 |
| Capacitor 81 | mfd 3 |
| Diode 86 | 10–D–6 |
| Resistor 87 | ohms 3000 |
| Zener diode 88 | 1N3793 |
| Capacitor 89 | mfd 50 |
| Resistor 91 | ohms 100,000 |
| Unijunction transistor 92 | 2N2160 |
| Resistor 94 | ohms 1000 |
| Resistor 95 | do 680 |
| Capacitor 96 | mfd 3 |
| Resistor 97 | ohms 270 |
| Diode 98 | 10–D–4 |
| Resistor 99 | ohms 47 |
| SCR 100 | G.E. C–22–B |
| Resistor 102 | ohms 60 |
| Capacitor 104 | mfd .05 |

Various other incubating devices can be constructed utilizing the principles of this invention. In the embodiment illustrated in FIGURES 5 and 6, a stack of electrically conductive sheets 122 are positioned upon a base 124 and between side supports 126 and 127 to form a laminate 120. Each of the sheets 122 has an electrically conductive surface 128, perpendicular to which are recesses 130. When the sheets are stacked (as shown in FIGURES 5 and 6) the recesses 130 are vertically aligned to receive specimen containers 134, such as conventional test tubes.

A pair of electrical contact strips 136 and 137 extend vertically along the sides of the laminate 120, and the contacts have extending ribs 138 which directly contact the conductive surfaces 128 of sheets 122. A suitable power supply is connected to leads 140 and 141 which are affixed to the contact strips 136 and 137 respectively, and the power supply is connected through the temperature regulating circuit illustrated in FIGURE 4.

The sheets 122 are removably stacked and a plastic strap 142 is provided to restrain the sheets from vertical movement. Strap 142 bridges the contact strips 136, 137 to prevent the strips from moving away from the laminate 120. Strap 142 is tightly applied against the top sheet 122 so that the sheets will be pressed downwardly and electrical contact between ribs 138 and surfaces 128 will be insured.

The laminate incubator provides a relatively inexpensive heating supply which can be varied in size to obtain the desired configuration. The specimen being incubated can be readily viewed if the electrically conductive sheets 122 consist of a light transmitting material such as E–C Glass manufactured by the Corning Glass Works.

The temperature of the specimen will be relatively constant throughout, particularly if several electrically conductive sheets are used. Because only the surface of the glass is electrically conductive, it is preferable that a plurality of sheets be stacked, in contrast to the use of a unitary block because the latter expedient does not afford the constant temperature achieved by the laminate.

In the FIGURE 7 embodiment, a slide 150 which includes several grooves 152 for receiving a specimen is formed of an electrically conductive light transmitting material. Although it is preferred that the undersurface of the slide be the electrically conductive surface, a suitable incubating device will be provided also if the grooved surface, rather than the undersurface, is electrically conductive. The slide is removably connected to contacts 154 to which leads 155, adaptable for connection to a suitable power supply, are affixed. The temperature of the slide is regulated by connecting a temperature sensing element to the slide and connecting leads 155 to the temperature regulating circuit illustrated in FIGURE 4. This embodiment provides effective incubation of slide specimens, which can be viewed through a microscope during the incubation thereof, and which do not require an external heat supply. The convenience, compactness, and relative economy of this embodiment of the invention is readily apparent.

In a further embodiment of the invention, a slide 158 of an electrically conductive light transmitting member 160 defines recesses 162 which are adapted to receive a specimen container 164, such as a capillary pipette or a test tube. The power supply leads 166 are affixed to the electrically conductive surface 168 and the temperature of member 160 is regulated by connecting a temperature sensing element thereto and utilizing the temperature regulating circuit illustrated in FIGURE 4. This embodiment affords a very compact, relatively inexpensive incubating device which enables viewing the specimen during incubation thereof, and also ready access to the specimen container. Various and other recesses can be formed for receiving many types of specimen containers and the electrically conductive member may take other shapes and forms.

The invention is not limited to usage of the temperature regulating circuit of FIGURE 4, and other regulating circuits may be effective. The illustrated embodiments also have utility where the temperature is not electronically regulated, for example, where the object is heated but not maintained at a constant temperature.

Although several preferred embodiments have been shown and described, it is to be understood that various modifications and substitutions may be made without departing from the spirit and scope of the invention.

What is claimed is:

1. An incubating apparatus which comprises: solid, electrically conductive light transmitting means for viewing and heating the specimen being incubated; means for supporting said light transmitting means; a member proximal said light transmitting means which member defines a plurality of grooves for receiving a plurality of specimen containers and for positioning the same in heating relationship with said light transmitting means; means for connecting an electrical current supply to said light transmitting means; and temperature regulating means for regulating the flow of current to said light transmitting means whereby the temperature of said light transmitting means and of the specimen proximal therewith is regulated.

2. The apparatus of claim 1 wherein said temperature regulating means includes a temperature sensing device connected directly to said light transmitting means.

3. An incubating apparatus which comprises: a chassis for viewing and heating a specimen; solid, electrically conductive light transmitting means carried within said chassis; means for supporting said light transmitting means; means for receiving a specimen, said specimen receiving means being positioned behind said light transmitting means and adjacent thereto for positioning the specimen in heating relationship with said light transmitting means; a fluorescent lamp positioned within said chassis for illuminating the specimen; means for supporting said fluorescent lamp; means for connecting an electrical current supply to said light transmitting means and to said fluorescent lamp; and a light transmissive solid member interposed between said receiving means and said fluorescent lamp for isolating the specimen from said lamp.

4. An incubating apparatus which comprises: a chassis for viewing and heating a specimen; solid, electrically conductive light transmitting means carried within said chassis; means for supporting said light transmitting means; means for receiving a specimen, said specimen receiving means being positioned behind said light transmitting means and adjacent thereto for positioning the specimen in heating relationship with said light transmitting means; a fluorescent lamp positioned within said chassis for illuminating the specimen; means for supporting said fluorescent lamp; a light transmissive solid member interposed between said receiving means and said fluorescent lamp for isolating the specimen from said lamp; means for connecting an electrical current supply to said light transmitting means and to said fluorescent lamp; temperature regulating circuit components connected to said current supply connecting means and carried within said chassis; and means for venting said chassis.

5. An incubating apparatus which comprises: a chassis for viewing and heating a specimen; solid, electrically conductive light transmitting means carried within said chassis; means for supporting said light transmitting means; means positioned behind said light transmitting means and adjacent thereto for receiving a specimen and for positioning the same in heating relationship therewith, said receiving means defining a plurality of grooves for receiving the specimen container; a fluorescent lamp positioned within said chassis for illuminating the specimen; means for supporting said fluorescent lamp; a solid, light transmitting member interposed between said receiving means and said fluorescent lamp for isolating the specimen from said lamp; means for connecting an electrical current supply to said light transmitting means and to said fluorescent lamp; temperature regulating circuit components connected to said current supply connecting means and carried within said chassis, said temperature regulating circuit including a temperature sensing device connected directly to said light transmitting means; means for indicating when said regulating circuit is in operation; and means for venting said chassis.

6. An apparatus for maintaining objects of small mass at an elevated temperature with minimal temperature fluctuation which comprises: a relatively large, solid member for heating said objects, said member having an electrically conductive surface; means for supporting said member; means adjacent said member for receiving the objects and for positioning the same in heating relationship therewith; means for connecting an electrical current supply to said member; and temperature regulating means for regulating the flow of current to said member whereby the temperature of said member and of the objects positioned adjacent thereto is regulated, said temperature regulating means providing proportional current control and including a temperature sensing device connected directly to said member.

References Cited

UNITED STATES PATENTS

| | | | |
|---|---|---|---|
| 3,026,400 | 3/1962 | Van Sciver | 219—415 X |
| 3,103,162 | 9/1963 | Scofield | 219—407 X |
| 3,299,253 | 1/1967 | Lawson | 219—385 |

RICHARD M. WOOD, *Primary Examiner.*

C. L. ALBRITTON, *Assistant Examiner.*

UNITED STATES PATENT OFFICE
CERTIFICATE OF CORRECTION

Patent No. 3,376,405                                    April 2, 1968

Francis B. Gower III

It is certified that error appears in the above identified patent and that said Letters Patent are hereby corrected as shown below:

Column 2, line 15, "In accordance with the present inention, there is pro-" should read -- In one embodiment of the invention temperature regu- --. Column 4, line 66, "positve" should read -- positive --. Column 6, line 10, "slide" should read -- side --. Column 6, lines 54 and 70, and Column 7, line 14, cancel "for viewing and heating a specimen", each occurrence, and insert the same after "chassis", each occurrence, in lines 56 and 72, same column 6, and line 16, same column 7.

Signed and sealed this 12th day of August 1969.

(SEAL)

Attest:

Edward M. Fletcher, Jr.

Attesting Officer

WILLIAM E. SCHUYLER, JR.

Commissioner of Patents